US009145153B2

(12) United States Patent
Huslak et al.

(10) Patent No.: US 9,145,153 B2
(45) Date of Patent: Sep. 29, 2015

(54) METHOD, SYSTEM AND COMPUTER PROGRAM PRODUCTS FOR REAL-TIME DEPARTURE ESTIMATIONS FOR TRANSPORTATION SYSTEMS

(75) Inventors: Nicholas S. Huslak, Johns Creek, GA (US); Edward M. Silver, Atlanta, GA (US); Terry Silver, legal representative, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1092 days.

(21) Appl. No.: 11/936,303

(22) Filed: Nov. 7, 2007

(65) Prior Publication Data

US 2009/0119006 A1 May 7, 2009

(51) Int. Cl.

*G01C 21/00* (2006.01)
*B61L 25/02* (2006.01)
*B61L 27/00* (2006.01)
*G08G 5/00* (2006.01)
*G08G 1/005* (2006.01)

(52) U.S. Cl.

CPC ........... *B61L 25/025* (2013.01); *B61L 27/0022* (2013.01); *G08G 5/0095* (2013.01); *G08G 1/005* (2013.01)

(58) Field of Classification Search

USPC .......................................... 701/200, 209, 210
See application file for complete search history.

(56) References Cited

U.S. PATENT DOCUMENTS

| | | | | |
|---|---|---|---|---|
| 6,178,378 | B1 * | 1/2001 | Leibold | 701/533 |
| 7,031,832 | B2 * | 4/2006 | Kawasaki et al. | 701/411 |
| 7,769,881 | B2 | 8/2010 | Matsubara et al. | |
| 7,865,297 | B2 | 1/2011 | Ruckart | |
| 2004/0148434 | A1 | 7/2004 | Matsubara et al. | |
| 2005/0049785 | A1 | 3/2005 | Vergin | |
| 2005/0075119 | A1 | 4/2005 | Sheha et al. | |
| 2005/0096842 | A1 * | 5/2005 | Tashiro | 701/210 |
| 2006/0223552 | A1 * | 10/2006 | True et al. | 455/466 |
| 2006/0230108 | A1 | 10/2006 | Tatsuta et al. | |
| 2007/0118415 | A1 * | 5/2007 | Chen et al. | 705/8 |
| 2007/0197231 | A1 * | 8/2007 | Lin | 455/456.1 |
| 2008/0014908 | A1 * | 1/2008 | Vasant | 455/414.1 |
| 2008/0059061 | A1 | 3/2008 | Lee | |

* cited by examiner

*Primary Examiner* — Imran Mustafa
(74) *Attorney, Agent, or Firm* — Myers Bigel Sibley & Sajovec, PA

(57) ABSTRACT

Methods, systems and computer program products estimate a departure time for a transportation user using a mobile device. A range of departure times, a user location and/or travel time to a station, and a transportation route can be received. Real-time location information for a plurality of transportation units on the transportation route can be received. One or more estimated departure times within the range of departure times can be calculated based on the user location and/or travel distance and the real-time location information of the plurality of transportation units for the transportation route.

18 Claims, 4 Drawing Sheets

METHOD, SYSTEM AND COMPUTER PROGRAM PRODUCTS FOR REAL-TIME DEPARTURE ESTIMATIONS FOR TRANSPORTATION SYSTEMS

FIELDS OF THE APPLICATION

The present application relates to the field of transportation and communications systems, and more particularly, to methods, systems and computer program products for estimating departure times for arrival at origination points in a transportation system and notifying a user accordingly.

BACKGROUND

As the price of gasoline increases, more people are turning to other modes of transportation as an economical alternative. However, users of public transportation systems may experience inconvenience and inefficiencies in this form of travel. For example, when a user needs to catch a bus or train car in a bus system or subway/train system (either a particular bus/train car, or any bus/train car during some specified interval), the user typically has to wait at a bus stop or train station. A user would ideally arrive at a bus stop or train station with sufficient time to board, but without a long wait time. Although public transportation systems usually attempt to run on a schedule, individual buses or trains are often not on schedule.

Even a discrepancy of a few minutes can result in a user missing a bus or train and waiting a longer period of time for the next bus or train. Users may also not judge accurately the amount of time needed to travel to the stop or station, and either arrive too early or too late, which results in longer wait times and longer total commuting times.

SUMMARY

According to some embodiments, methods, systems and computer program products for estimating a departure time for a transportation user using a mobile device are provided. A range of departure times, a user location and/or travel time to a station, and a transportation route can be received. Real-time location information for a plurality of transportation units on the transportation route can be received. One or more estimated departure times within the range of departure times can be calculated based on the user location and/or travel distance and the real-time location information of the plurality of transportation units for the transportation route.

In some embodiments, the travel time can be calculated based on the distance between the user and a station in the transportation route. In some embodiments, the travel time is input by the user.

In some embodiments, the location information of at least one of the plurality of transportation units and the user can be updated, and arrival times for the transportation unit and the user at the station on the transportation route can be estimated. The user can be notified if the estimated arrival time for the user is after the estimated arrival time for the transportation unit. A next available transportation unit can be determined, and the user may be notified of an arrival time for the next available transportation unit.

In some embodiments, a user location can be determined based on a location of the mobile device. The user can be notified of the one or more estimated departure times using the mobile device.

In some embodiments, a travel route to the station can be selected based on the current location of the mobile device. A map and/or directions to the stations can be provided based on the selected travel route.

In some embodiments, methods, systems and computer program products can be provided for estimating a departure time for an airplane transportation user using a mobile device. Flight information and a user location and/or travel time to an airport can be received. Real-time check-in wait delay information and flight status information can be received. An estimated departure time can be calculated based on the user location and/or travel distance and the real-time check-in wait delay information and flight status information.

In some embodiments, the user location and/or travel time to an airport, the real-time check-in wait delay information and the flight status information can be updated. Arrival times for the flight and the user at the airport can be estimated based on the updated user location and/or travel time to the airport, or real-time check-in wait delay information in the flight status information.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

BRIEF DESCRIPTION OF THE DRAWINGS

The accompanying drawings, which are incorporated in and constitute a part of the specification, illustrate embodiments of the invention and, together with the description, serve to explain principles of embodiments of the invention.

DETAILED DESCRIPTION

Figure 1:
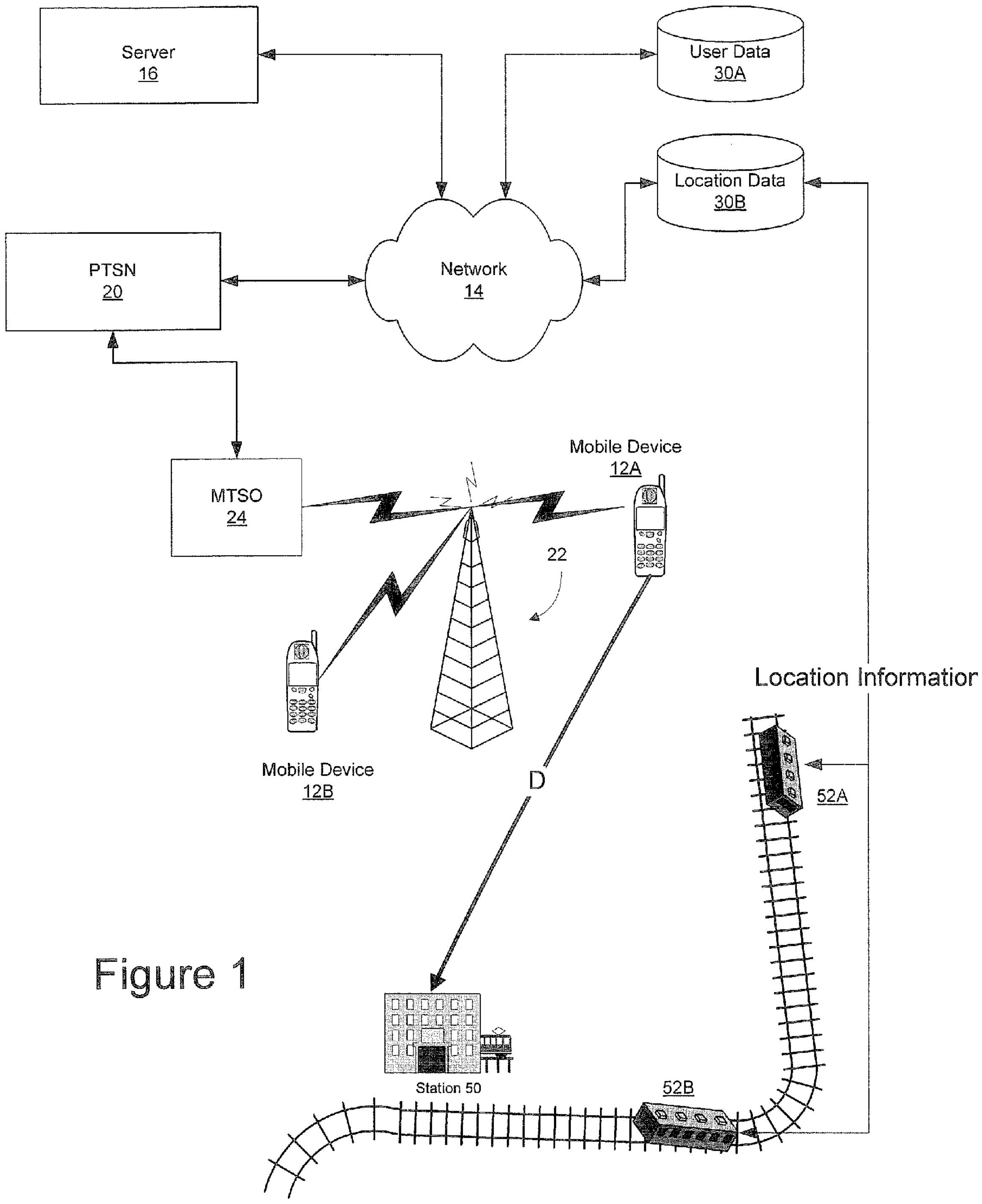
FIG. 1 is a schematic diagram of a system for estimating departure times for a user using a mobile device according to embodiments of the current invention.

The present invention now will be described hereinafter with reference to the accompanying drawings and examples, in which embodiments of the invention are shown. Embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Embodiments of the present invention are described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 illustrates a network environment in which embodiments of the present invention may be utilized. As will be appreciated by those of skill in the art, however, the operations of embodiments of the present invention may be carried out on a processing system that communicates with one or more other devices with or without access to a network, such as an intranet or the Internet. As seen in FIG. 1, mobile devices 12A and 12B can communicate over a network 14. The mobile devices 12A and 12B can be radiotelephones or other handheld devices, such as a personal wirelessly enabled digital assistants (personal data assistants (PDAs), such as Palm Pilot™ or a Pocket PC™, smartphones, pagers, wireless messaging devices (such as a Blackberry™ wireless handheld device), wireless enabled laptop computers, other mobile communications devices and/or combinations thereof. The mobile devices 12A and 12B can communicate through one or more mobile telecommunications switching offices (MTSOs) 24 via base stations 22. The MTSO 24 may provide communications with a public telecommunications switching network (PTSN) 20, which can, in turn, can provide communications with the network 14. The mobile devices 12A and 12B may be connected to the network 14 using various techniques, including those known to those of skill in the art, such as using a Wireless Fidelity (Wi-Fi) or Worldwide Interoperability for Microwave Access (Wi-Max) connection.

The mobile devices 12A and 12B can be located at a distance D from a public transportation station 50. The transportation station 50 can be part of a public transportation system that includes public transportation units, such as trains 52A and 52B. Although the public transportation system in FIG. 1 is illustrated with respect to trains 52A and 52B, it should be understood that the trains 52A and 52B can be any form of public transportation, including subway cars, buses, planes and the like.

As is further illustrated in FIG. 1, the server 16 can be in communication with data sources such as user data 30A and position data 30B, and/or the PTSN 20. The data 30A and 30B can be computer servers, processing systems, and/or other network elements that can send data to the devices 12A and 12B over the network 14.

It should be understood that the various devices 12A and 12B can communicate with the network 14 directly or indirectly, such as via other networks, including wireless networks. Moreover, devices can be provided that combine certain functionalities of the various devices 12A and 12B. For example, a single device may be configured to connect to the network 14 through either the base station 22, the MTSO 24, the PTSN 20, a modem, a wireless network or a combination thereof.

The devices 12A and 12B may utilize applications to communicate over the base station (s) 22, the MTISO 24, and/or network 14 to another mobile device, stationary device, or data processing system, such as a server 16. The network 14 may be an intranet or the Internet or other networks known to those of skill in the art. The devices 12A and 12B can include applications that can display the data in a display window, which can be provided on the devices 12A and 12B and viewed and manipulated by the user.

Figure 2:
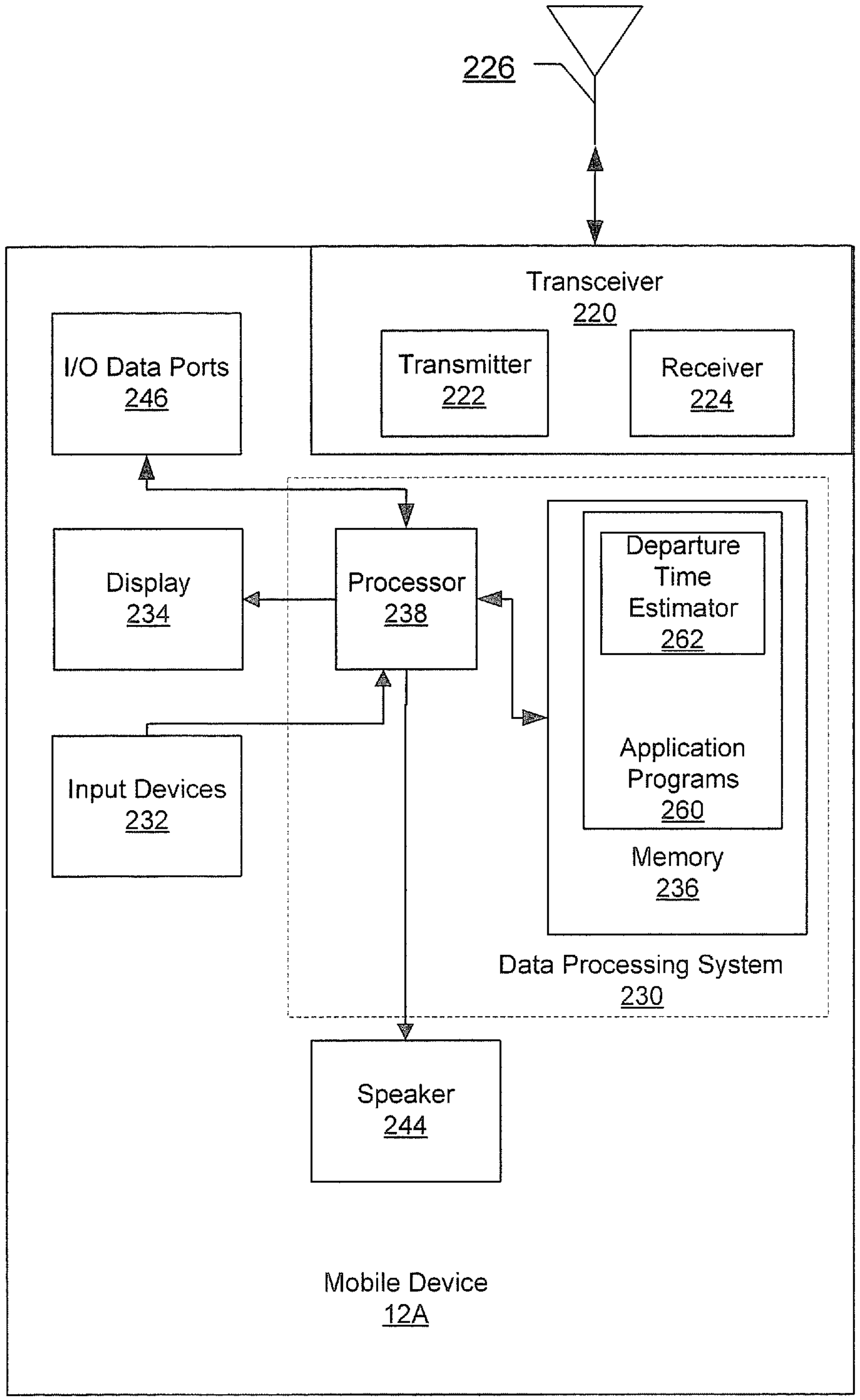
FIG. 2 is a schematic diagram of the mobile device according to embodiments of the current invention.

Referring to FIG. 2, exemplary embodiments of a mobile device 12A having a data processing system 230 in accordance with embodiments are shown. The mobile device 12A may include input device(s) 232 (such as a keyboard or keypad, touch sensitive screen, light sensitive screen, and/or mouse), a display 234, and a memory 236 that communicate with a processor 238. The mobile device 12A may further include a speaker 244, and an I/O data port(s) 246 that also communicates with the processor 238. The I/O data port(s) 246 can be used to transfer information between the data processing system 230 and another computer system or a network (e.g., the Internet). These components may be conventional components such as those used in many conventional data processing systems, which may be configured to operate as described herein. The mobile device 12A may include a wireless transceiver 220 coupled to an antenna 226 and the processing system 230. The transceiver 220 includes a wireless transceiver including a transmitter 222 and a receiver 224 configured to establish a wireless connection, such as a cellular telephone connection, with at least one other mobile electronic device and/or base station within the range of the transceiver 220. In some embodiments, the antenna 226 may be a directional antenna array configured to be used to determine a traveling vector (including speed, distance, direction of movement, and/or relative positional data) for the mobile electronic device 12A based on a signal received from the antenna 226 by a base station. While only a single antenna 226 is illustrated in FIG. 2 by way of example, multiple antennas may be provided.

The memory 236 of the data processing system 230 can include controller(s), such as application programs 260. The application programs 260 are illustrative of the programs that implement the various features of the data processing system 230 and can include at least one application that provides operations of some embodiments. As shown in FIG. 2, the application programs 260 include a departure time estimator 262.

Although some embodiments are illustrated, for example, with reference to application programs 260 and the departure time estimator 262, as will be appreciated by those of skill in the art, the application programs 260 and the departure time estimator 262 may also be incorporated into other components of the mobile device 12A or in a processor on the network 14 of FIG. 1, such as the server 16. Thus, the present invention should not be construed as limited to the configurations illustrated but is intended to encompass any configuration capable of carrying out the operations described herein.

Figure 3:
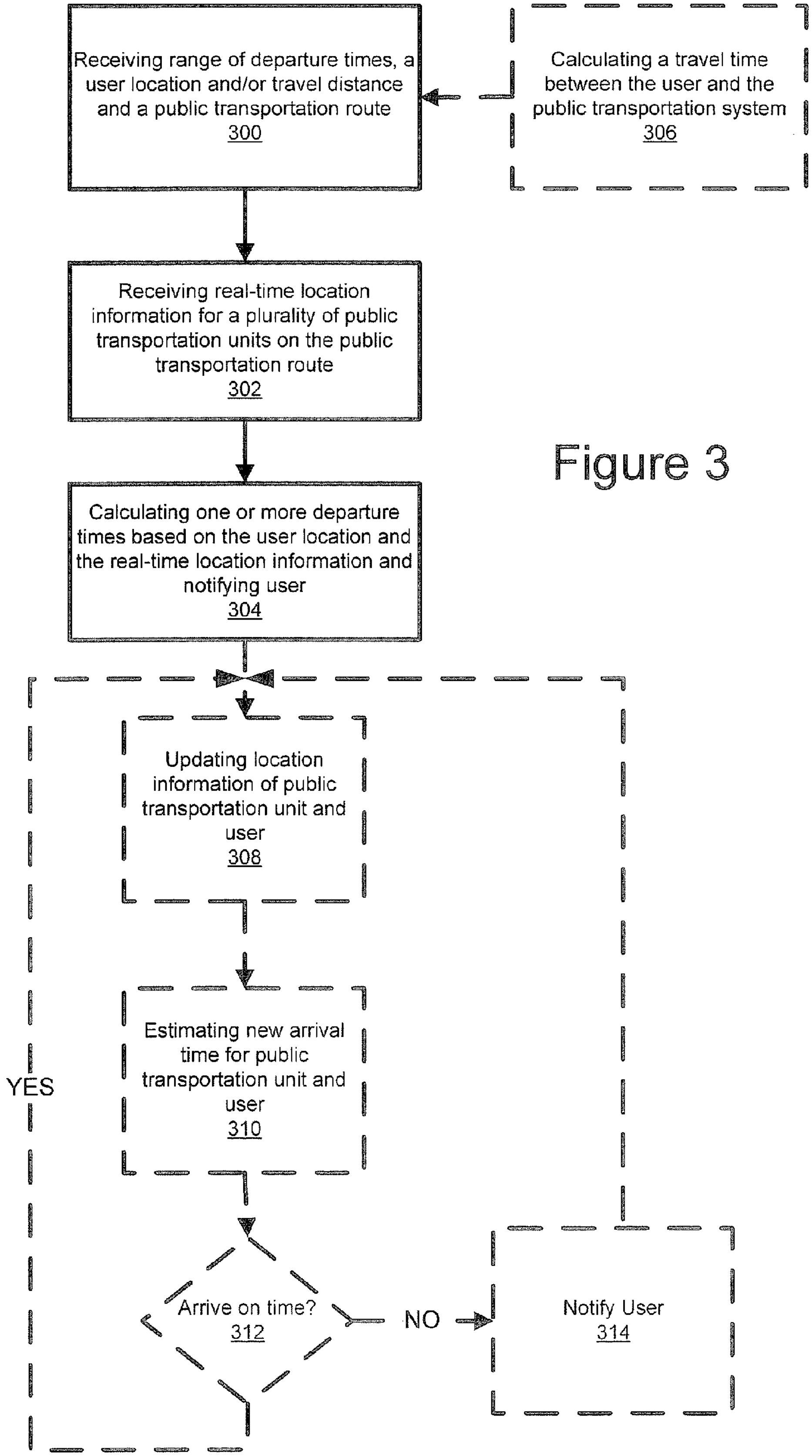
FIGS. 3-4 are flowcharts illustrating operations according to embodiments of the current invention.

Operations according to some embodiments, which may be carried out by the mobile device 12A and/or network 14 of FIGS. 1 and 2 are illustrated in FIG. 3. For example, the departure time estimator 262 can receive a range of departure times, a user location and/or distance D to the station 50 and a public transportation route (Block 300). As shown in FIG. 1, the public transportation route can be the route illustrated by the trains 52A and 52B and the station 50. The user location can be the location of the mobile device 12A or a distance D or departure time to the station 50. The user location can be determined using a global positioning system (GPS) or other suitable locating techniques, for example, signal triangulation techniques for locating a mobile wireless device, such as a cellular phone. The range of departure times is typically selected by a user. For example, if the user wishes to leave work to catch a subway train or bus home between 5:00 and 5:30, the user can select the range of departure times in this time interval.

The real-time location information for a plurality of public transportation units (e.g., the trains 52A and 52B) on the public transportation route is also received (Block 302). As illustrated in FIG. 1, the real-time location information of the trains 52A and 52B can be communicated to the location information data 30B of the network 14. It should be understood that the location information of the trains 52A and 52B can be received using any suitable technique. For example, the trains 52A and 52B can include global positioning devices for tracking the location of the trains 52A and 52B or sensors can be used to notify the location information data 30B of the network 14 when the trains 52A or 52B are at certain positions along the track, for example, using a master panel showing train locations based upon passage through checkpoints (e.g., station entry/exit points or milestones on the route).

The mobile device 12A can calculate one or more estimated departure times based on the user location and/or distance D to the station 50 and the real-time location information of the trains 52A and 52B (Block 304). For example, if it takes the user ten minutes to travel the distance D to the station 50, and the real-time location information of the trains 52A and 52B indicates that the train 52A will arrive at the station 50 at 5:15 and the train 52B will arrive at the station 50 at 5:25, then the user should depart its location to travel the distance D to the station 50 at about 5:05 or 5:15. In some embodiments, the departure time calculation can include an additional amount of time, such as one to five minutes, to account for variations in travel and/or boarding times.

Accordingly, the mobile device 12A (or other processor in the network 14) can calculate an estimated departure time for a user to reach a public transportation route with sufficient time to board a public transportation unit (such as a bus, train or plane) while generally avoiding excessively long wait times. Some embodiments may reduce wait times for public transportation and/or reduce the risk of missing a bus, train or plane by using real-time information regarding the status of a public transportation route and calculating an estimated departure time based on the user location.

In some embodiments, the user can be notified of the estimated departure times by one of the mobile device 12A with an audible notification (such as an alarm), a visible notification, a vibrational notification or other suitable notification techniques. The mobile device 12A can also give the user a notification a period of time before the estimated departure time, for example, to notify the user that he or she should leave within five minutes in order to catch a train or bus.

In particular embodiments, the departure times are calculated at Block 304 based on the travel time between the user and a station on the public transportation system. The travel time can be calculated based on an actual distance between the user and the station (Block 306), for example, based on the position of the mobile device 12A.

As further illustrated in FIG. 3, the location information of the train 52A or 52B (or other public transportation unit) and the user can be updated (Block 308). A new arrival time at the station can be estimated for the selected train 52A or 52B and the user (Block 310). If the estimated arrival time for the user is after the estimated arrival time for the selected train 52A or 52B, the mobile device 12A can notify the user that the user may be late, and consequently, risk missing the train (Block 314). For example, the mobile device 12A can determine a next available train and notify the user of the arrival time of the next available train. The mobile device 12A can also provide the user with an estimate of the amount of time by which the user may be late.

In some embodiments, the mobile device 12A can select a travel route to the station 50 based on the current location of the mobile device 12A. The mobile device 12A can provide a map and/or directions to the station 50 based on the selected travel route.

Figure 4:
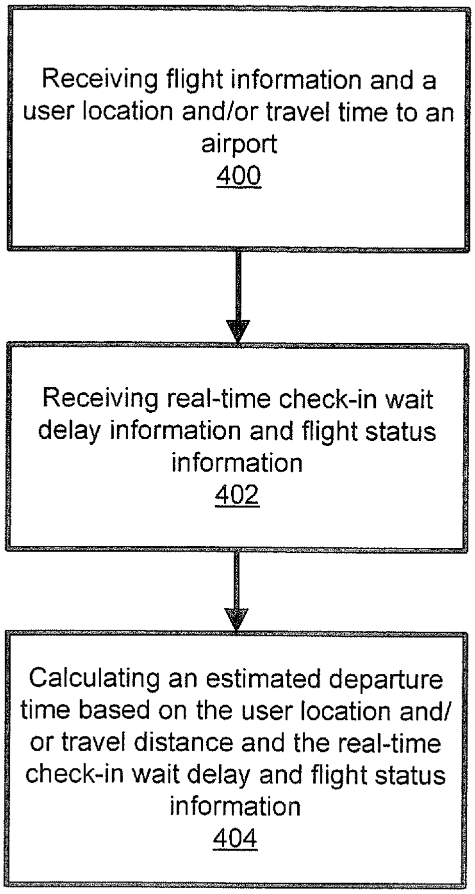

Although some embodiments are described herein with respect to trains 52A and 52B and a station 50, it should be understood that other forms of transportation may be used without departing from the scope of the invention, including buses and airplanes. For example, as shown in FIG. 4, departure times may be estimated for an airplane transportation user using a mobile device. Flight information and a user location and/or travel time to an airport can be received (Block 400), for example, on the mobile device 12A. Real-time check-in wait delay information and flight status information can also be received (Block 402). The real-time check-in wait delay information refers to information relating to the amount of time needed to board a flight, including, for example, wait times to check baggage, obtain boarding passes, and/or pass through a security line. For example, airport personnel can provide estimates for waiting in check-in lines for a particular airplane carrier and/or for waiting in security lines. These estimates can be updated in real-time and provided to data sources accessible to the mobile device 12A, such as the data sources 30A and 30B of FIG. 1. The flight status information can include information about a particular flight, including an estimated arrival time and/or whether the flight is likely to be late, early or on-time. An estimated departure time can be calculated based on the user location and/or travel distance and the real-time check-in wait delay information and flight status information (Block 404).

Although embodiments of the current invention are described with respect to public transportation systems, it should be understood that the current invention can be applied to publicly or privately owned transportations systems, including airplane travel, airport shuttles, private limousines, or public or private buses departing on a schedule.

Although some embodiments are described herein with respect to a single user of the transportation, additional embodiments may involve a plurality of users departing from different points (e.g., homes/offices within walking distance of a particular transportation origination point) and planning to arrive at the same transportation origination point using another embodiment that coordinates information from the plurality of users and estimates a departure time for each of them.

Accordingly, users of airplane transportation systems can receive an estimate for their departure time to travel to an airport, for example, from a home or office location, in order to arrive on time for a flight. According to some embodiments, the estimated departure time can reduce the amount of unnecessary waiting by using real-time flight status information and real-time check-in wait delay information.

Additional information regarding the flight status may also be provided to the user. For example, the user location and/or travel time to an airport, the real-time check-in wait delay information and the flight status information can be updated. Arrival time is for the flight and the user at the airport can be estimated based on the updated information, and the user can be notified if the estimated arrival time for the user is after the estimated arrival time for the flight, e.g., to alert the user that he or she may be late for the flight. In some embodiments, the user can be notified if the estimated arrival time for the user is a long time before the flight, e.g., if the flight is delayed. If the user realizes that the flight is delayed while the user is traveling to the airport, the user may have the opportunity to change plans, e.g., to stop and have a meal or engage in another activity rather than arrive too early at the airport.

It should be understood that various additional factors may be used to modify or calculate an estimated departure time. For example, departure times can be modified based on current or expected travel conditions, including traffic delays. In some embodiments, the departure times of two or more people can be coordinated so that they will arrive at approximately the same time in order to catch the same train, bus or plane.

The foregoing is illustrative of embodiments of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method comprising:

performing operations as follows on a processor:

receiving a range of first departure times selected by a first user, a travel time of the first user to a station served by a plurality of transportation units according to a schedule, and a transportation route, wherein the station is on the transportation route, and a first user location that is remote from the station;

receiving global positioning device location information for the plurality of transportation units on the transportation route;

receiving a range of second departure times selected by a second user, a travel time of the second user to the station and a second user location that is remote from the station;

calculating a plurality of first departure times within the range of first departure times based on the travel time of first user to the station and the global positioning device location information for the plurality of transportation units such that if the first user departs first user location at a selected one of the first departure times, the first user will reach the station with at least time to board one of the plurality of transportation units; and calculating a plurality of second departure times within the range of second departure times based on the travel time of the second user such that if the second user departs the second user location at a selected one of the second departure times, the second user will reach the station with at least time to board the one of the plurality of transportation units;

wherein the plurality of first departure times and the plurality of second departure times are calculated such that the first and second user arrive at the station at approximately the same time.

2. The method of claim 1, further comprising:

calculating the travel time of the first user based on a first distance between the first user and the station; and calculating the travel time of the second user based on a second distance between the second user and the station.

3. The method of claim 1, wherein the travel time of the first user is input by the first user and the travel time of second first user is input by the second user.

4. The method of claim 1, further comprising:

determining the first user location based on a location of a first mobile device associated with the first user; and determining the second user location based on a location of a second mobile device associated with the second user.

5. The method of claim 1, further comprising:

notifying the first user of the plurality of first departure times using a first mobile device associated with the first user; and notifying the second user of the plurality of second departure times using a second mobile device associated with the second user.

6. The method of claim 1, further comprising:

selecting a first travel route to the station based on a current location of a first mobile device associated with the first user;

selecting a second travel route to the station based on a current location of a second mobile device associated with the second user.

7. An apparatus, comprising:

a processor; and a memory coupled to the processor and comprising computer readable program code embodied in the memory that when executed by the processor causes the processor to perform operations comprising:

receiving a range of first departure times selected by a first user, a travel time of the first user to a station served by a plurality of transportation units according to a schedule, and a transportation route, wherein the station is on the transportation route, and a first user location that is remote from the station;

receiving global positioning device location information for the plurality of transportation units on the transportation route;

receiving a range of second departure times selected by a second user, a travel time of the second user to the station and a second user location that is remote from the station;

calculating a plurality of first departure times within the range of first departure times based on the travel time of first user to the station and the global positioning device location information for the plurality of transportation units such that if the first user departs first user location at a selected one of the first departure times, the first user will reach the station with at least time to board one of the plurality of transportation units; and calculating a plurality of second departure times within the range of second departure times based on the travel time of the second user such that if the second user departs the second user location at a selected one of the second departure times, the second user will reach the station with at least time to board the one of the plurality of transportation units;

wherein the plurality of first departure times and the plurality of second departure times are calculated such that the first and second user arrive at the station at approximately the same time.

8. The apparatus of claim 7, wherein the operations further comprise:

calculating the travel time of the first user based on a first distance between the first user and the station; and calculating the travel time of the second user based on a second distance between the second user and the station.

9. The apparatus of claim 7, wherein the travel time of the first user is input by the first user and the travel time of second first user is input by the second user.

10. The apparatus of claim 7, wherein the operations further comprise:

determining the first user location based on a location of a first mobile device associated with the first user; and determining the second user location based on a location of a second mobile device associated with the second user.

11. The apparatus of claim 7, wherein the operations further comprise:

notifying the first user of the plurality of first departure times using a first mobile device associated with the first user; and notifying the second user of the plurality of second departure times using a second mobile device associated with the second user.

12. The apparatus of claim 7, wherein the operations further comprise:

selecting a first travel route to the station based on a current location of a first mobile device associated with the first user;

selecting a second travel route to the station based on a current location of a second mobile device associated with the second user.

13. A computer program product, comprising:

a non-transitory computer readable storage medium comprising computer readable program code embodied in the medium that when executed by a processor causes the processor to perform operations comprising:

receiving a range of first departure times selected by a first user, a travel time of the first user to a station served by a plurality of transportation units according to a schedule, and a transportation route, wherein the station is on the transportation route, and a first user location that is remote from the station;

receiving global positioning device location information for the plurality of transportation units on the transportation route;

receiving a range of second departure times selected by a second user, a travel time of the second user to the station and a second user location that is remote from the station;

calculating a plurality of first departure times within the range of first departure times based on the travel time of first user to the station and the global positioning device location information for the plurality of transportation units such that if the first user departs first user location at a selected one of the first departure times, the first user will reach the station with at least time to board one of the plurality of transportation units; and calculating a plurality of second departure times within the range of second departure times based on the travel time of the second user such that if the second user departs the second user location at a selected one of the second departure times, the second user will reach the station with at least time to board the one of the plurality of transportation units;

wherein the plurality of first departure times and the plurality of second departure times are calculated such that the first and second user arrive at the station at approximately the same time.

14. The computer program product of claim 13, wherein the operations further comprise:

calculating the travel time of the first user based on a first distance between the first user and the station; and calculating the travel time of the second user based on a second distance between the second user and the station.

15. The computer program product of claim 13, wherein the travel time of the first user is input by the first user and the travel time of second first user is input by the second user.

16. The computer program product of claim 13, wherein the operations further comprise:

determining the first user location based on a location of a first mobile device associated with the first user; and determining the second user location based on a location of a second mobile device associated with the second user.

17. The computer program product of claim 13, wherein the operations further comprise:

notifying the first user of the plurality of first departure times using a first mobile device associated with the first user; and notifying the second user of the plurality of second departure times using a second mobile device associated with the second user.

18. The computer program product of claim 13, wherein the operations further comprise:

selecting a first travel route to the station based on a current location of a first mobile device associated with the first user;

selecting a second travel route to the station based on a current location of a second mobile device associated with the second user.

* * * * *